(12) United States Patent
Carr et al.

(10) Patent No.: US 12,046,013 B2
(45) Date of Patent: Jul. 23, 2024

(54) USING RELEVANCE OF OBJECTS TO ASSESS PERFORMANCE OF AN AUTONOMOUS VEHICLE PERCEPTION SYSTEM

(71) Applicant: Ford Global Technologies, LLC, Dearborn, MI (US)

(72) Inventors: G. Peter K. Carr, Allison Park, PA (US); FNU Ratnesh Kumar, Campbell, CA (US)

(73) Assignee: Ford Global Technologies LLC, Dearborn, MI (US)

( * ) Notice: Subject to any disclaimer, the term of this patent is extended or adjusted under 35 U.S.C. 154(b) by 156 days.

(21) Appl. No.: 17/330,876

(22) Filed: May 26, 2021

(65) Prior Publication Data

US 2022/0379911 A1    Dec. 1, 2022

(51) Int. Cl.
*G06V 10/25* (2022.01)
*B60W 30/12* (2020.01)
(Continued)

(52) U.S. Cl.
CPC ............. *G06V 10/25* (2022.01); *B60W 30/12* (2013.01); *B60W 60/001* (2020.02);
(Continued)

(58) Field of Classification Search
CPC .. B60W 60/00; B60W 30/00; B60W 2552/00; B60W 2420/00; G06V 10/00; G06V 20/00
See application file for complete search history.

(56) References Cited

U.S. PATENT DOCUMENTS 9,682,704 B2    6/2017  Teller et al.
11,433,885 B1*  9/2022  Beller ................. B60W 30/095
(Continued)

FOREIGN PATENT DOCUMENTS

WO    2019040349 A1    2/2019
WO    2020245654 A1    12/2020

OTHER PUBLICATIONS

Chang, M. et al., "Argoverse: 3D Tracking and Forecasting with Rich Maps," Computer Vision Foundation, pp. 8748-8757.
(Continued)

*Primary Examiner* — Andrew R Dyer
*Assistant Examiner* — Elizabeth J Slowik
(74) *Attorney, Agent, or Firm* — Frank A. MacKenzie; Brooks Kushman, P.C.

(57) ABSTRACT

Methods of determining relevance of objects that a vehicle detected are disclosed. A system will receive a data log of a run of the vehicle. The data log includes perception data captured by vehicle sensors during the run. The system will identify an interaction time, along with a look-ahead lane based on a lane in which the vehicle traveled during the run. The system will define a region of interest (ROI) that includes a lane segment within the look-ahead lane. The system will identify, from the perception data, objects that the vehicle detected within the ROI during the run. For each object, the system will determine a detectability value by measuring an amount of the object that the vehicle detected. The system will create a subset with only objects having at least a threshold detectability value, and it will classify any such object as a priority relevant object.

20 Claims, 9 Drawing Sheets

(51) Int. Cl.
  *B60W 60/00* (2020.01)
  *G06V 20/56* (2022.01)
(52) U.S. Cl.
  CPC ....... *G06V 20/56* (2022.01); *B60W 2420/403* (2013.01); *B60W 2552/53* (2020.02)

(56) References Cited

U.S. PATENT DOCUMENTS

| | | | |
|---|---|---|---|
| 2013/0063600 A1* | 3/2013 | Pawlicki | G01S 13/867 |
| | | | 348/148 |
| 2017/0161569 A1 | 6/2017 | Ren | |
| 2017/0297571 A1* | 10/2017 | Sorstedt | G05D 1/0278 |
| 2019/0092235 A1 | 3/2019 | Kim et al. | |
| 2019/0103026 A1 | 4/2019 | Liu et al. | |
| 2019/0220014 A1* | 7/2019 | Bradley | G06N 20/00 |
| 2019/0259284 A1 | 8/2019 | Khadloya | |
| 2019/0384291 A1* | 12/2019 | Michalakis | G06V 10/764 |
| 2020/0159215 A1* | 5/2020 | Ding | B60W 60/00276 |
| 2020/0160712 A1* | 5/2020 | Beaurepaire | G08G 1/148 |
| 2020/0307563 A1* | 10/2020 | Ghafarianzadeh | G06V 40/25 |
| 2020/0394909 A1 | 12/2020 | Kawai et al. | |
| 2021/0080959 A1 | 3/2021 | Wang | |
| 2021/0097304 A1 | 4/2021 | Agrawal | |
| 2021/0109525 A1* | 4/2021 | Russell | G08G 1/0133 |
| 2021/0165932 A1* | 6/2021 | Mohan | G06F 11/3476 |
| 2021/0181758 A1 | 6/2021 | Das | |
| 2021/0241002 A1* | 8/2021 | Agrawal | G05D 1/0246 |
| 2021/0370980 A1 | 12/2021 | Ramamoorthy | |
| 2021/0382488 A1* | 12/2021 | Haynes | G06V 10/82 |
| 2022/0227367 A1 | 7/2022 | Kario | |
| 2022/0343241 A1* | 10/2022 | Jha | H04L 65/1069 |

OTHER PUBLICATIONS

Information about Related Patents and Patent Applications, see section 4 of the accompanying Information Disclosure Statement Letter, which concerns Related Patents and Patent Applications.

Yurtsever, E. et al., "A Survey of Autonomous Driving: Common Practices and Emerging Technologies," arXiv:1906.05113, Apr. 2, 2020, 28 pages.

Gonzalez, D. et al., "A Review of Motion Planning Techniques for Automated Vehicles," IEEE Transactions on Intelligent Transportation Systems, vol. 17, Issue 4, Apr. 2016, pp. 1135-1145.

* cited by examiner

USING RELEVANCE OF OBJECTS TO ASSESS PERFORMANCE OF AN AUTONOMOUS VEHICLE PERCEPTION SYSTEM

BACKGROUND

As an autonomous vehicle (AV) moves about an environment, its perception system will detect many actors that are moving, or which may move, within or near the AV's path of travel. The AV will predict what some or all of the detected actors will do. The AV's motion planning system will then consider these predictions when determining what trajectory that the AV will follow to avoid conflict with the other actors.

As the AV and the other actors continue to move, the AV will continuously collect new perception data about the other actors. This is a computationally intensive process. When the AV detects multiple actors, predicting and considering each actor's intentions requires significant processing time, stored energy, memory to store the data, and other AV resources. In addition, because AVs must operate and make decisions in real-time, the AV may need to make some of the computations within specified time constraints.

To resolve this, some systems prioritize other actors and make binary decisions as to whether or not an actor is a high-priority agent or not. These systems then only make predictions only for high-priority agents. This can lead to either (a) the omission of an actor for whom a prediction is needed, or (b) violation of run-time processing constraints if too many actors are classified as high-priority agents.

Therefore, improvements in AV perception systems are needed. This document describes methods and systems that are directed to addressing the problems described above, and/or other issues.

SUMMARY

In some embodiments, a vehicle may determine relevance of objects that its perception system detects in its environment. When the vehicle's perception system detects objects that are proximate to the vehicle, a processor that is onboard or in communication with the vehicle will identify a time horizon. The processor will also identify a look-ahead lane based on a lane in which the vehicle is currently traveling. The processor will define a region of interest (ROI) that includes one or more lane segments within the look-ahead lane. The processor will identify a first subset that includes objects located within the ROI, but not objects not located within the ROI. The processor will identify a second subset that includes objects located within the ROI that may interact with the vehicle during the time horizon, but not excludes actors that may not interact with the vehicle during the time horizon. The processor will then classify any object that is in the first subset, the second subset or both subsets as a priority relevant object.

Optionally, when executing a motion planning operation for the vehicle within the time horizon, a motion planning system of the vehicle may use all objects that are classified as priority relevant objects in the motion planning operation and exclude at least one object that is not classified as a priority relevant object from the motion planning operation.

Optionally, when identifying the look-ahead lane the system may look for (a) a lane that a motion planning system of the vehicle indicates the vehicle will enter within the time horizon, or (b) a lane that a prediction system of the AV predicts that the vehicle will enter within the time horizon.

Optionally, when identifying the look-ahead lane the system may access a vector map of the environment and identify, in the vector map, a lane that (a) conflicts with the lane in which the vehicle is currently traveling; and (b) either (i) is within a minimum distance from the vehicle, or (ii) the vehicle is expected to reach within the time horizon by continuing along the lane in which the vehicle is currently traveling.

Optionally, when defining the ROI the system may include in the ROI one or more lane segments of a lane that is adjacent to one of the look-ahead lanes.

In some embodiments, a display device within the vehicle may output an identifier of each priority relevant object, along with indicia of priority for each priority relevant object. The display device also may output a map showing the ROI and the detected objects that are within the ROI.

Optionally, when identifying the second subset the system may, for each object that is within the first subset, determine whether that object can interact with the vehicle during the time horizon.

Optionally, defining the ROI also may include: (i) accessing a vector map that includes the look-ahead lane; (ii) identifying, in the vector map, a feature that extends beyond the ROI; and (iii) extending the ROI to include the identified feature.

In some embodiments, a computer-implemented system for determining relevance of objects detected by a vehicle in an environment will receive a data log of a run of the vehicle in the environment. The data log includes perception data captured by sensors of the vehicle during the run. The system will identify an interaction time, and it will also determine a look-ahead lane based on a lane in which the vehicle traveled during the run. The system will define a region of interest (ROI) that includes a lane segment within the look-ahead lane. The system will identify, from the perception data, various objects that the vehicle detected within the ROI during the run. For each of the objects, the system will determine a detectability value by measuring an amount of the object that the vehicle detected within the interaction time. The system will identify a subset that includes only those objects having a detectability value that exceeds a threshold, and it will classify any object that is in the subset as a priority relevant object.

In some embodiments, the system may then use the subset to assess accuracy of a perception algorithm that the vehicle may use during a future run. For example, the system may apply the perception algorithm to data from the data log in a simulation to determine whether a value for a vehicle operational metric in the simulation meets a minimum acceptable value.

Optionally, when identifying the look-ahead lane the system may identify a speed of travel of the vehicle during the run while the vehicle was in the location in the lane. The system may then use the speed of travel to determine a potential distance of travel for the vehicle during the interaction time. The system may then identify the look-ahead lane as a lane that is within the potential distance of travel from the location.

Optionally, when defining the ROI, the system may identify a speed of travel of the vehicle during the run while the vehicle was in the location in the lane, use the speed of travel to determining a potential distance of travel for the vehicle during the interaction time, and define the ROI to include at least the potential distance of travel ahead of the vehicle in both the lane of travel and in at least one adjacent lane that is next to the lane of travel.

Optionally, when defining the ROI the system may access a vector map that includes a location through which the vehicle traveled during the run, determine a potential distance of travel for the vehicle during the interaction time, examine the vector map and identify any lane segments in the vector map that are within the potential distance of travel from the location, and include the identified lane segments in the ROI.

Optionally, when defining the ROI the system may: (i) identify, in the vector map, a feature that extends beyond the identified lane segments; (ii) extend the ROI to include the identified feature.

Optionally, when determining the detectability value for each object the system may measure a number of LiDAR points that are present in the perception data for the object, and it may use the number of LiDAR points to calculate the detectability value.

Optionally, when determining the detectability value for each object the system may measure an amount of occlusion between the object and the vehicle, and it may use the measured amount to calculate the detectability value.

Optionally, when determining the detectability value for each object the system may measure an amount of the interaction time during which the object was within the ROI, and it may use the measured amount to calculate the detectability value.

DETAILED DESCRIPTION

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to." Definitions for additional terms that are relevant to this document are included at the end of this Detailed Description.

An autonomous vehicle (AV) must be able to predict the future trajectories of actors that it detects in its environment in order to make safe and efficient behavior decisions. However, as noted above, the number of actors that an AV may detect can be large, especially in a crowded urban environment or a busy highway near on-ramps or off-ramps. This can cause actor perception and prediction to be very computationally intensive. This document describes novel approaches by which an AV may perceive a group of objects and assess which of those objects are relatively more relevant to the AV's near-future path. This process can help improve computational efficiency and processing time, while also retaining data about other objects that may become relevant as the AV moves further along its path. The process can be performed on-board a vehicle while the vehicle is moving through an environment. The processes also can be performed off-board the vehicle, after the AV has moved through the environment, to help in regression testing and also to help measure accuracy of the AV's perception algorithms.

Figure 1:
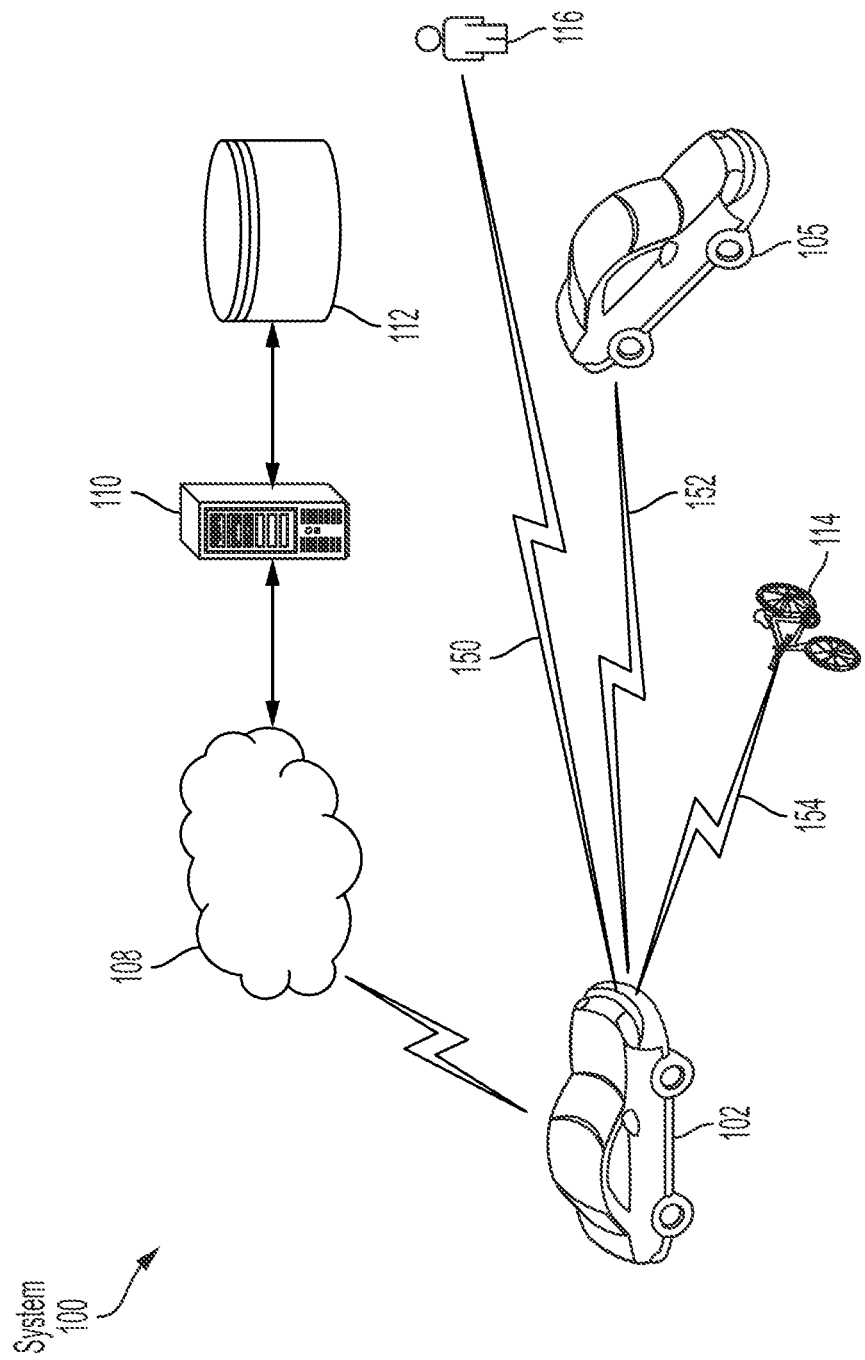
FIG. 1 illustrates how an autonomous vehicle may perceive various other actors in an environment in which the vehicle is moving or will move.

Before discussing the current approaches, it is useful to describe how an AV may perceive an actor in an environment. FIG. 1 illustrates an example system 100 that includes a vehicle 102 that is traveling along a road in a semi-autonomous or autonomous manner. Vehicle 102 may be an AV, and thus, may be referred to as "AV 102." The AV 102 can be, but is not limited to, a land vehicle (as shown in FIG. 1), an aircraft, or a watercraft.

AV 102 is generally configured to detect other objects such as actors 105, 114, 116 within the range and field of detection of its sensors. The actors can include, for example, another vehicle 105, a cyclist 114 (such as a rider of a bicycle, electric scooter, motorcycle, or the like) and/or a pedestrian 116. This object detection can be made, for example, by analyzing sensor data generated by at least one sensor device on the AV 102 and/or information received from a communication device (e.g., a transceiver, a beacon and/or a smart phone) of the object via communication link(s) 150, 152, 154. The communication link(s) 150, 152, 154 can include, but are not limited to, V2X communication links. The term "V2X" refers to a communication between a vehicle and any entity that may affect, or may be affected by, the vehicle.

When such a detection is made, AV 102 performs operations to: generate one or more possible actor trajectories (or predicted paths of travel) for the detected actor; and use at least one of the generated possible object trajectories (or predicted paths of travel) to facilitate a determination of a vehicle trajectory for the AV. The AV 102 may then perform operations to follow the vehicle trajectory.

Figure 2:
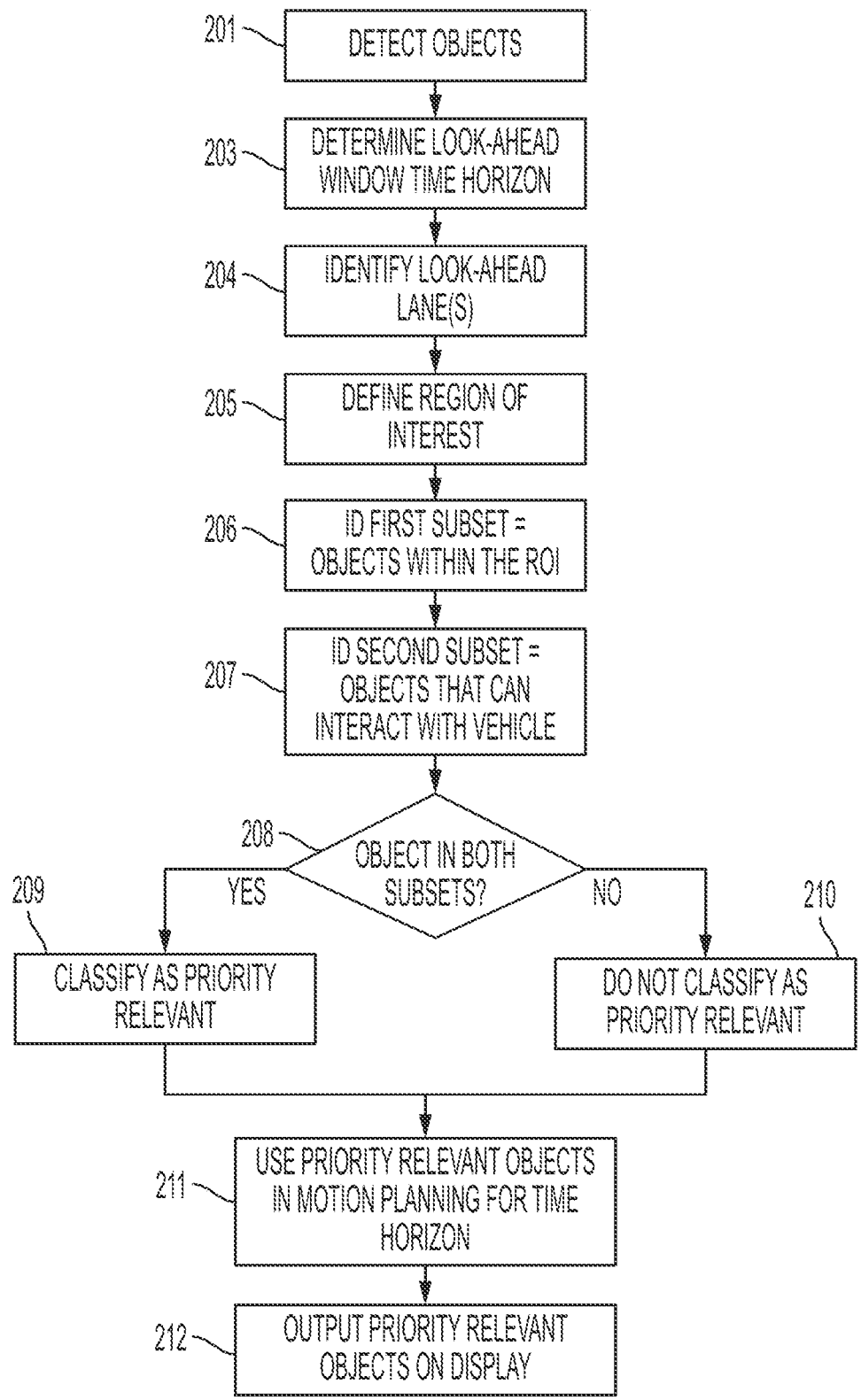
FIG. 2 demonstrates example steps of a method by which an AV's onboard systems may assess relevance of objects that the AV perceives in its environment while the AV moves through the environment.

FIG. 2 demonstrates example steps of a method by which an AV may assess relevance of objects that the AV perceives in its environment while the AV moves through the environment. At 201 a perception system of the vehicle will detect objects that are in an environment that is proximate to the vehicle, using processes such as that described above in FIG. 1.

At 203 the perception system or another vehicle subsystem will identify a look-ahead window, which is a time horizon ahead of the current time. The duration of the look-ahead window may be a fixed duration (such as 2, 5 or 10 milliseconds), or it may vary based on one or more rules that consider factors such as the speed of the vehicle, a class of area in which the vehicle is traveling (example: urban, rural, highway, etc.), or other factors.

At 204 the system will identify one or more look-ahead lanes. The system will use the lane in which the vehicle is currently traveling to select at least one of the look-ahead lanes. For example, the algorithm to identify the look-ahead lanes may require that the look-ahead lanes include: (i) a lane in which the vehicle is currently traveling (lane 321 in FIG. 3); (ii) any lane that is adjacent to the current lane of travel or within two lanes of the vehicle's current lane of travel; (iii) any lane that meets other specified criteria; and/or (iv) any lane that meets a combination of specified criteria. Look-ahead lanes also may include lanes that a motion planning system of the vehicle indicates the vehicle will enter within the time horizon, and/or lanes that the prediction system predicts that the vehicle will enter within the time horizon. The system also may identify as look-ahead lanes by accessing a vector map of the environment and identifying, in the vector map, a lane that (a) conflicts with the lane in which the vehicle is currently traveling, and (b) either (i) is within a minimum distance from the vehicle, or (ii) the vehicle is expected to reach within the time horizon by continuing along the lane in which the vehicle is currently traveling.

At 205 the system will define a region of interest (ROI) that includes one or more lane segments within the one or more look-ahead lanes. The ROI may include any lane segment that qualifies as a look-ahead lane and that is within a specified distance from the vehicle. The specified distance may be a distance that the vehicle could reach within the time horizon based on the vehicle's current speed (distance=speed*time horizon), or from which a moving object traveling at a designated speed could conflict with the vehicle's trajectory during the time horizon. The designated speed may be a posted speed limit as determined from map data, signs detected by a vehicle camera, and/or other sources such as vehicle-to-infrastructure communications, or it may be a function of such a speed, such as 110% of the posted speed limit, or 80% of the posted speed limit. Defining the ROI also may require that the any lane segment of a lane that is adjacent to one of the look-ahead lanes be included in the ROI. The system also may analyze characteristics of the look-ahead lanes as recorded in vector map data to determine the boundaries of the ROI. For example, if a stop sign is in a look-ahead lane within a threshold distance from the vehicle then the system may extend (or reduce) the ROI boundary of the look-ahead lane to correspond to a location that a specified distance away from the stop sign. As another example, if the ROI boundary is positioned inside of a crosswalk or intersection, the system may extend that ROI boundary to the relatively furthest boundary of the crosswalk or intersection.

Figure 3:
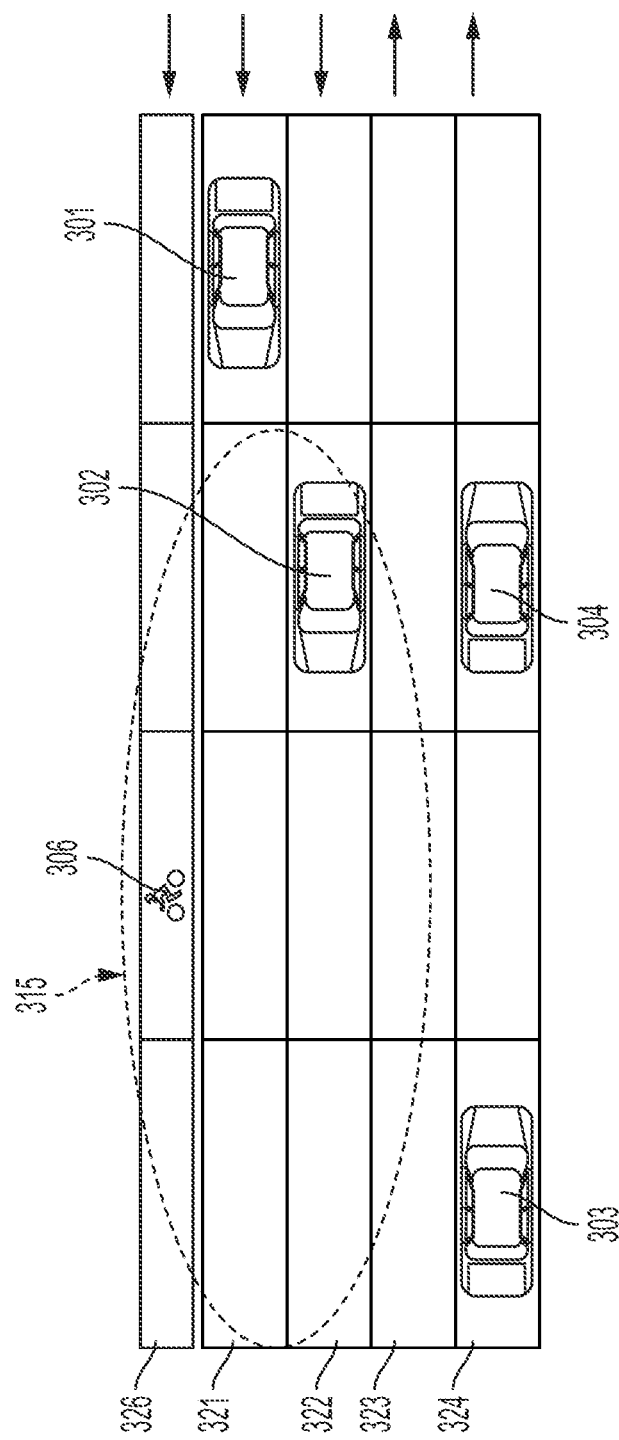
FIG. 3 illustrates how a system may determine a region of interest and assign priority to actors that the AV perceives.

FIG. 3 illustrates an example ROI 315 that is in front of an AV 301. The AV 301 is traveling in a first lane 321 from right to left in the illustration. A second lane 322 is adjacent to left of the first lane 321 and has a direction of travel that is the same as that of the first lane 321. An object that is a second vehicle 302 is traveling in a lane segment of the second lane 321. A third lane 323 is adjacent to the second lane 322 and two lanes away from first lane 321. Third lane 323 has a direction of travel that is the opposite of that as that of the first lane 321 and second lane 322. A fourth lane 324 is on the other side of third lane 323, and is three lanes away from first lane 321. A third vehicle 303 is traveling in one lane segment of the fourth lane 324. and a fourth vehicle 304 is traveling in another lane segment of the fourth lane 324. Finally, a bike lane 326 is adjacent to the right of first lane 321, and an object that is a cyclist 306 is traveling in the bike lane. Each lane includes multiple lane segments. The ROI 315 is defined in front of AV 301, and it includes segments of the first lane 321, second lane 322, third lane 323 and bike lane 326. The second vehicle 302 and cyclist 306 are within the ROI, while the third vehicle 303 and the fourth vehicle 304 are not within the ROI.

Figure 4:
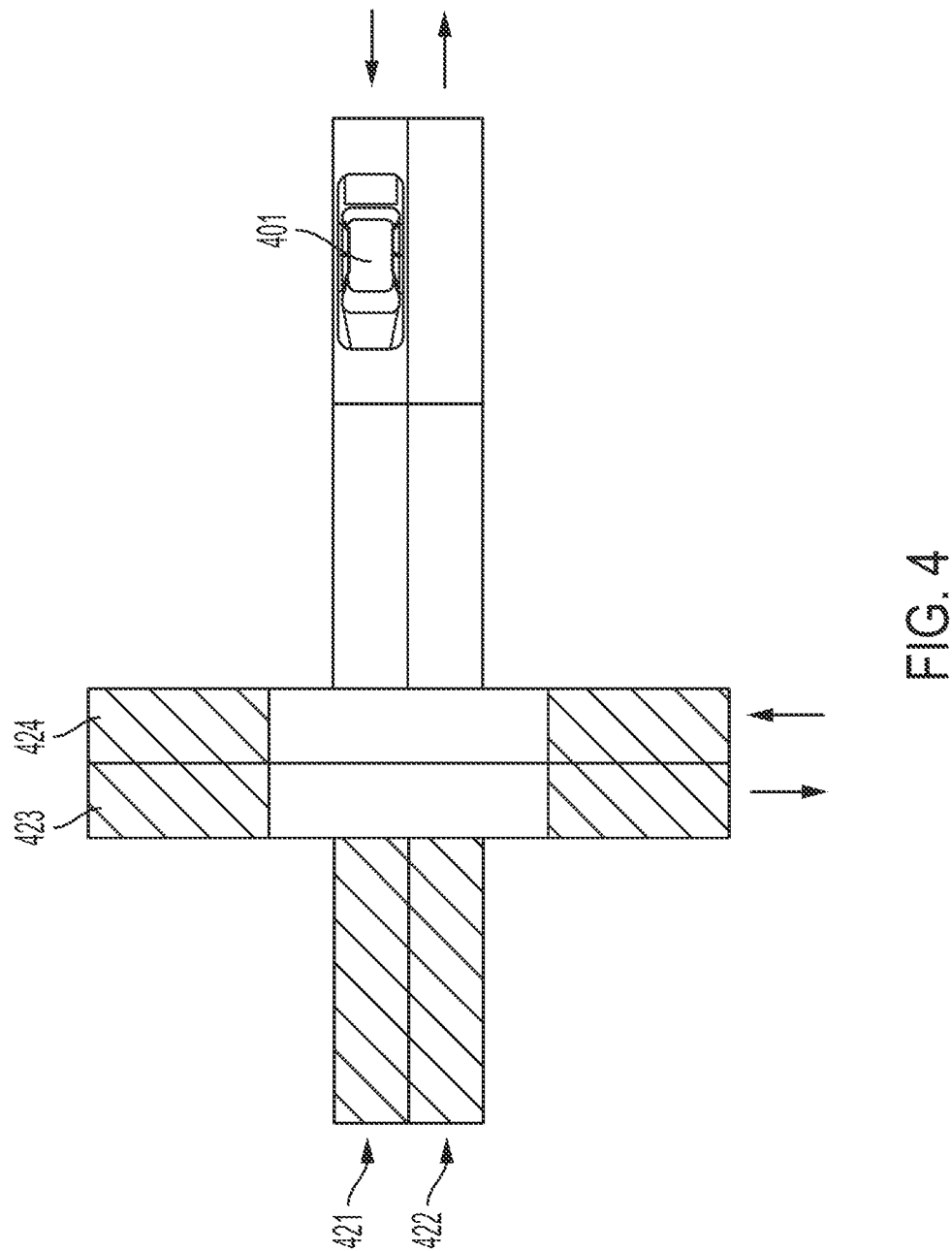
FIG. 4 illustrates another example of a region of interest in an area where the AV is approaching an intersection.

FIG. 4 illustrates another ROI that is in front of an AV 401. In this case, AV 401 is traveling in lane 421 of a road that also includes lane 422. The road intersects with a road having lanes 423 and 424. Assume for the sake of illustration that a stop sign is positioned at the intersection to stop the AV before it enters the intersection. The ROI therefore includes those lane segments that are not pattern-filled in FIG. 4 and excludes lane segments that are pattern-filled.

Returning to FIG. 2, at 206 the system will include in a first subset those objects that are located within the ROI and that excludes objects not located within the ROI. At 207 the system will include in a second subset any detected objects that may interact with the vehicle during the time horizon; actors that may not interact with the vehicle during the time horizon will be excluded from the second subset. When developing the second subset at 207, the system may consider only those objects included in the first subset, or the system may consider a larger grouping of the detected objects. To determine those objects that may interact with the vehicle, the system may first estimate a velocity of the detected object. The system may estimate the velocity from data captured by the vehicle's LiDAR system, cameras, or other sensors. Alternatively, the system may estimate the actor's velocity to be equal to or a function of a posted speed limit of the road (as detected from map data or camera data)—for example, the estimated velocity of a vehicle traveling on a road may be the posted speed limit of the road. As another alternative, the system may estimate the velocity of the vehicle using a physics-based motion model and estimating the worst-case velocity using the highest velocity physically possible for the detected object type. In any of these situations, the system may then use the estimated velocity of the detected actor and a velocity of the vehicle (as reported by the vehicle's onboard systems) to measure whether the detected actor can reach the vehicle's planned path within the time horizon, assuming that the other actor and the vehicle maintain their speeds. For example, the system may use the basic equation of D(istance)=V(elocity)*T(ime) for the AV and the actor to determine when the actor will catch up to the AV. If the other actor cannot reach the vehicle within the time horizon, then the system may determine that will not interact with the vehicle; otherwise, the system may determine that the other actor may interact with the vehicle.

At 208 the system will determine which objects are in either or both the first subset and the second subset. In some embodiments, the system may consider an object to be a priority relevant object if that object is in either the first subset or the second subset. In other embodiments, may consider an object to be a priority relevant object only if that object is in both of the subsets. Either way, at 209 it will classify all such objects priority relevant objects; other objects will not be classified as priority relevant (see 210). For example, referring to FIG. 3, second vehicle 302, and cyclist 306 are all within the ROI. The system may determine that the second vehicle 302 and cyclist 306 can reach the AV 301 within the time horizon. (For purposes of this document, "reach the AV" means that the object may move toward the AV and reach it, the AV may move toward the object so that the object reaches the AV, or both.) Thus, second vehicle 302 and cyclist 306 will be classified as priority relevant objects. Third vehicle 303 is outside the ROI but may reach the AV 301 within the time horizon. Thus, the system will classify third vehicle 303 as a priority relevant object. The system may determine that fourth vehicle 304 cannot reach the AV 301 within the time horizon, and thus fourth vehicle 304 will not be classified as a priority relevant object.

Returning again to FIG. 2, when a motion planning system of the AV executes a motion planning operation for the vehicle within the time horizon using processes such as those described below in FIG. 7, at 211 it may use in the motion planning operation all objects that are classified as priority relevant objects, and it may exclude at least one object that is not classified as a priority relevant object from the motion planning operation. In addition, at 212 the system may output, on a display of an electronic device that is integral with or being transported within the vehicle: (i) a map showing the ROI and some or all of the detected objects that are within the ROI; and (ii) an identifier for each priority relevant object along with indicia of priority for each priority relevant object. The indicia may be a word label, a color, or some other indicia that visibly distinguishes priority relevant objects from other objects that are displayed. (Optionally, the display may output only priority relevant objects and not other objects, in which case the indicia of priority is simply the fact that the object is displayed.)

Figure 5:
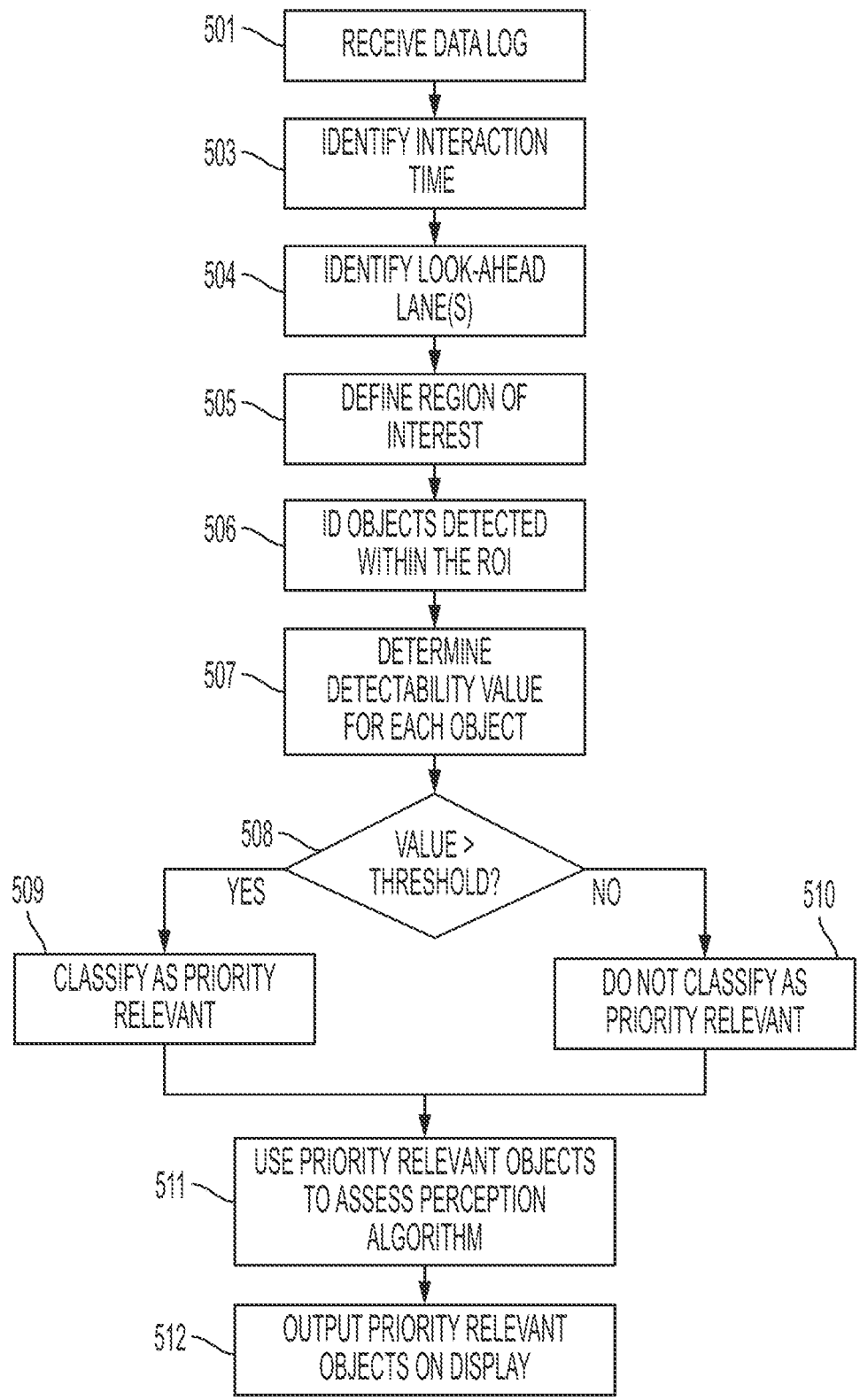
FIG. 5 demonstrates example steps of a method by which an offline system may assess relevance of objects that the AV perceived in its environment while the AV was moving through the environment.

FIG. 5 illustrates example steps of a method by which an offline system may assess relevance of objects that the AV perceived in its environment while the AV was moving through the environment. At 501 a perception system of the vehicle will detect objects that are in an environment that is proximate to the vehicle, using processes such as that described above in FIG. 2. This will be done prior to the offline process, and in the remaining steps of FIG. 5 the offline process will then use data log of perception data that the vehicle captured.

At 503 the system will identify an interaction time, which is a time window from a selected point in time during which the vehicle could react with one or more other objects. As with the look-ahead window of the online process, the interaction time may be a fixed duration (such as 2, 5 or 10 milliseconds), or it may vary based on one or more rules that consider factors such as the speed of the vehicle, a class of area in which the vehicle is traveling (example: urban, rural, highway, etc.), or other factors.

At 504 the system will identify one or more look-ahead lanes with respect to a particular location of the vehicle during a run of the vehicle. For example, the algorithm to identify the look-ahead lanes may require that the look-ahead lanes include: (i) a "current" lane that includes the particular location (see lane 321 in FIG. 3 for an example); (ii) any lane that is adjacent to the current lane or within two lanes of the current lane; (ii) any lane that meets other specified criteria; and/or (iv) any lane that meets a combination of specified criteria. The system also may identify as look-ahead lanes by accessing a vector map of the environment and identify, in the vector map, a lane that (a) conflicts with the current lane, and (b) either (i) is within a minimum distance from the vehicle, or (ii) the vehicle could have reached within the interaction time.

At 505 the system will define a region of interest (ROI) that includes one or more lane segments within the one or more look-ahead lanes. The ROI may include any lane segment that qualifies as a look-ahead lane and that is within a specified distance from the vehicle. To determine the specified distance, the system may identify a speed of travel of the vehicle during the run while the vehicle was in a particular location in a lane, and it may use the speed of travel to determine a potential distance of travel for the vehicle during the interaction time (distance=speed*interaction time). The ROI may include any lane segment that is within the potential distance of travel from the particular location, and/or additional lane segments, such as any lane segment that is adjacent to one of the look-ahead lanes.

As another way to define the ROI in step 505, the system may access a vector map that includes a location through which the vehicle traveled during the run. The system also may determine a potential distance of travel for the vehicle during the interaction time using processes such as those described above. The system may then examine the vector map and identify any lane segments in the vector map that are within the potential distance of travel from the vehicle. The system also may analyze characteristics of the look-ahead lanes as recorded in the vector map data to determine the boundaries of the ROI, using processes such as those included above in the discussion of FIG. 2.

At 506 the system will analyze the perception data and identify objects that the vehicle detected within the ROI during the run. The system may do this using processes such as those described above in FIG. 1 and below in FIG. 7, and/or other processes.

Figure 6:
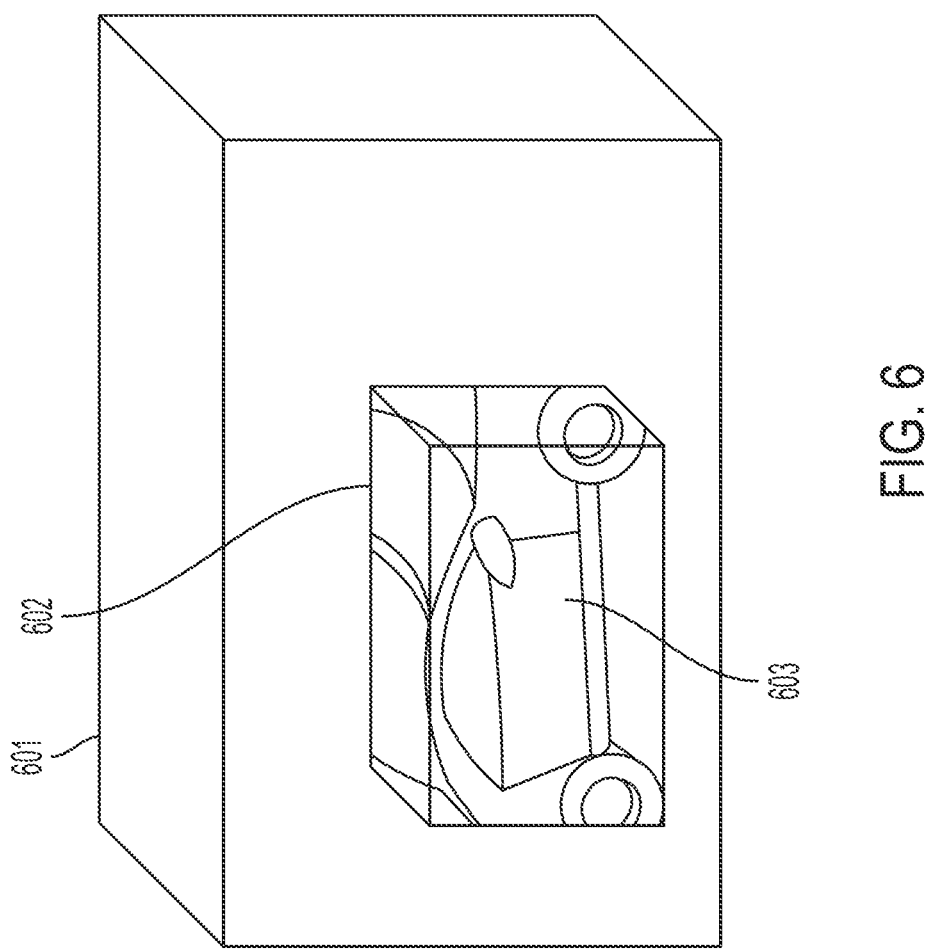
FIG. 6 illustrates a process by which a system may determine a detectability value for an object that is perceived by an AV's sensors but which is not fully visible.

For each of the objects, at 507 the system will determine a detectability value by measuring an amount of the object that the vehicle detected within the interaction time. The system may determine the detectability value in any of several suitable ways. For example, the system may determine a measurement corresponding to a number of LiDAR points that are present in the perception data for the object; and it may then use the measurement of LiDAR points to calculate the detectability value. To do this, the system may examine a user-labeled object in the LiDAR data and determine an amodal cuboid for the object and a shrinkwrap cuboid for the object. This is illustrated in FIG. 6, in which an object 603 appears in LiDAR data but is occluded and thus not fully detected. The object 603 is shown as a vehicle in FIG. 6 for illustration, but in actual LiDAR data the object 603 would appear as a point cloud. The amodal cuboid 601 is the true expected extent of the object's boundaries—which may be received from human input or otherwise received. The shrinkwrap cuboid 602 is a tightly fit around the actual LiDAR points that are present for the object in the perception data. The measurement may be of the number of LiDAR points in the shrinkwrap cuboid 602, such as by a volumetric intersection over union between the amodal cuboid 601 and the shrinkwrapped cuboid. The measurement may then be compared to the number of LiDAR points that would be expected in the amodal cuboid 601, to assess how much of the object 603 is detectable (as a percentage of the total possible LiDAR points, as a ratio of the points in the amodal cuboid 602 to the total possible points, or by some other measurement. Additional details of processes for determining amodal cuboids are disclosed in U.S. patent application Ser. No. 17/741,637, the disclosure of which is fully incorporated into this document by reference. For example, an amodal cuboid can be defined by: identifying LiDAR data points inside one of the loose-fit cuboids; removing data points from the LiDAR data points that are associated with ground; defining a tight-fit cuboid that tightly fits the LiDAR data points; accumulating LiDAR data points in the loose-fit cuboids over a time period; defining an accumulated-fit cuboid that tightly fits the accumulated LiDAR data points of the loose-fit cuboids; and/or determining an amodal extent using the accumulated-fit cuboid and prior amodal extents for an object. The present solution is not limited to the particulars of this example.

As another method of determining the detectability value at 507, the system may measuring an amount of occlusion between the object and the vehicle, and it may then use the measured amount to calculate the detectability value. To measure the amount of occlusion, the system may draw lines from the vehicle to the outermost edges of the object, and then measure an amount of the area between the lines (if any) that is occluded by another object.

As yet another method of determining the detectability value for each object at 507, the system may measure the amount of the interaction time during which the object was within the ROI. The system may measure the amount to calculate the detectability value, such as by assigning the detectability value to be the percentage of the interaction time during which the object was within the ROI.

Optionally, the system may determine the detectability value at 507 using a combination of any or all of the processes described above, and/or other processes.

At 508, the system will identify a subset that includes only those objects having a detectability value that exceeds a threshold. At 509 the system will classify any object that is in the subset as a priority relevant object. The system may not classify other objects as priority relevant objects (step 510).

At 511 the system may use the output of the assessment (such as which objects are in the subset of priority relevant objects) to assess accuracy of a perception algorithm that the vehicle may use during a future run. For example, the system may apply the perception algorithm to data from the data log in a simulation to determine whether all priority relevant objects are detected in the simulation. In addition, the system may use the output to determine values for other vehicle operational metrics such as speed/course error, duration based speed error (the average speed error based on duration of the vehicle's run), and/or over-segmentation or under-segmentation, and assess whether the determined values meet minimum acceptable values.

At 512 the system may output, on a display device: (i) a map showing the ROI and some or all of the detected objects that are within the ROI; and (ii) an identifier for each priority relevant object along with indicia of priority for each priority relevant object. The indicia may be a word label, a color, or some other indicia that visibly distinguishes priority relevant objects from other objects that are displayed. (Optionally, the display may output only priority relevant objects and not other objects, in which case the indicia of priority is simply the fact that the object is displayed.) The information output may be time-dependent, so that it is automatically presented at times when the information is relevant to the vehicle's operation, and not at other times.

Figure 7:
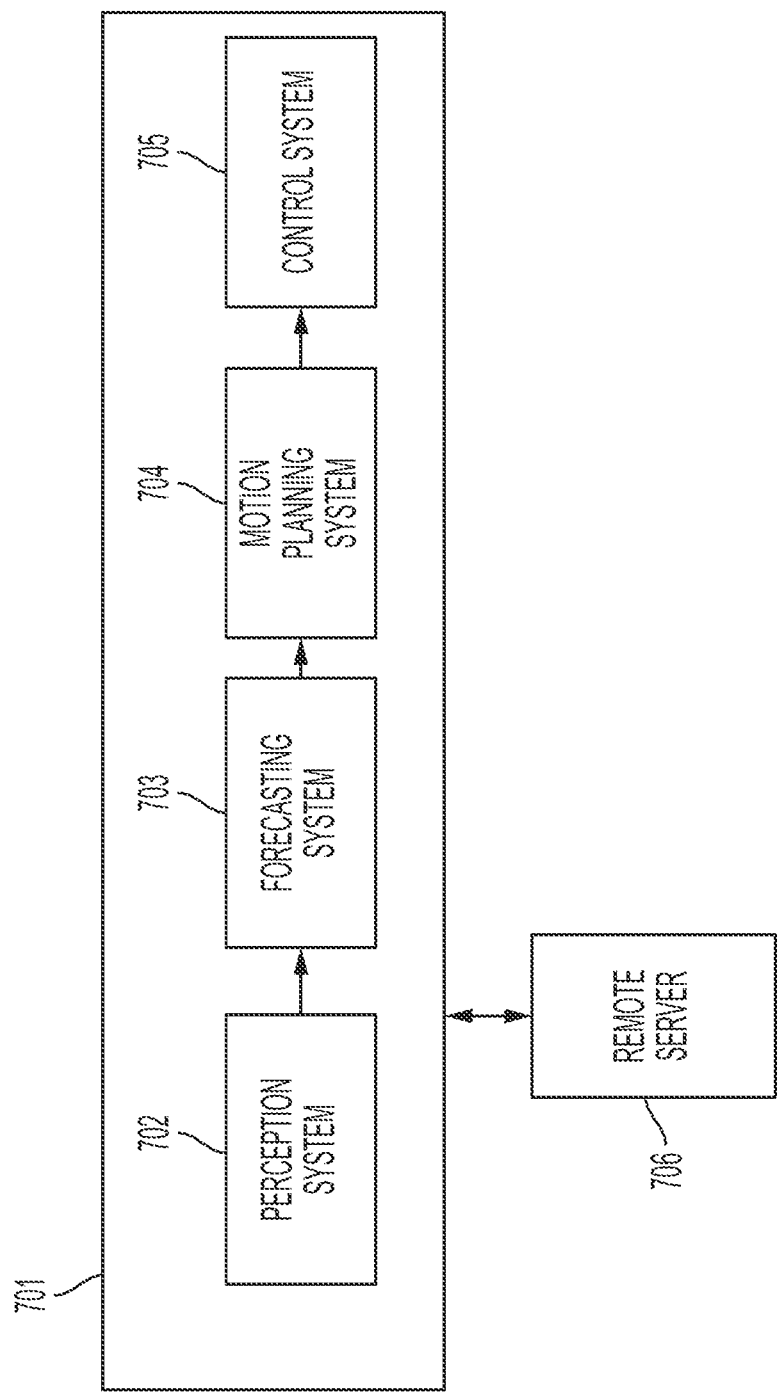
FIG. 7 is a block diagram illustrating various high-level systems of an autonomous vehicle.

FIG. 7 shows a high-level overview of AV subsystems that may be relevant to the discussion above. Specific components within such systems will be described in the discussion of FIG. 8 later in this document. Certain components of the subsystems may be embodied in processor hardware and computer-readable programming instructions that are part of the AV's on-board computing system 701. The subsystems may include a perception system 702 that includes sensors that capture information about moving actors and other objects that exist in the vehicle's immediate surroundings. Example sensors include cameras, LiDAR sensors and radar sensors. The data captured by such sensors (such as digital image, LiDAR point cloud data, or radar data) is known as perception data.

The perception system may include one or more processors, and computer-readable memory with programming instructions and/or trained artificial intelligence models that, during a run of the AV, will process the perception data to identify objects and assign categorical labels and unique identifiers to each object detected in a scene. Categorical labels may include categories such as vehicle, bicyclist, pedestrian, building, and the like. Methods of identifying objects and assigning categorical labels to objects are well known in the art, and any suitable classification process may be used, such as those that make bounding box predictions for detected objects in a scene and use convolutional neural networks or other computer vision models. Some such processes are described in "Yurtsever et al., A Survey of Autonomous Driving: Common Practices and Emerging Technologies" (arXiv Apr. 2, 2020).

The vehicle's perception system 702 may deliver perception data to the vehicle's forecasting system 703. The forecasting system (which also may be referred to as a prediction system) will include processors and computer-readable programming instructions that are configured to process data received from the perception system and forecast actions of other actors that the perception system detects.

The vehicle's perception system, as well as the vehicle's forecasting system, will deliver data and information to the vehicle's motion planning system 704 and control system 705 so that the receiving systems may assess such data and initiate any number of reactive motions to such data. The motion planning system 704 and control system 705 include and/or share one or more processors and computer-readable programming instructions that are configured to process data received from the other systems, determine a trajectory for the vehicle, and output commands to vehicle hardware to move the vehicle according to the determined trajectory. Example actions that such commands may cause include causing the vehicle's brake control system to actuate, causing the vehicle's acceleration control subsystem to increase speed of the vehicle, or causing the vehicle's steering control subsystem to turn the vehicle. Various motion planning techniques are well known, for example as described in Gonzalez et al., "A Review of Motion Planning Techniques for Automated Vehicles," published in IEEE Transactions on Intelligent Transportation Systems, vol. 17, no. 4 (April 2016).

During deployment of the AV, the AV receives perception data from one or more sensors of the AV's perception system. The perception data may include data representative of one or more objects in the environment. The perception system will process the data to identify objects and assign categorical labels and unique identifiers to each object detected in a scene.

Figure 8:
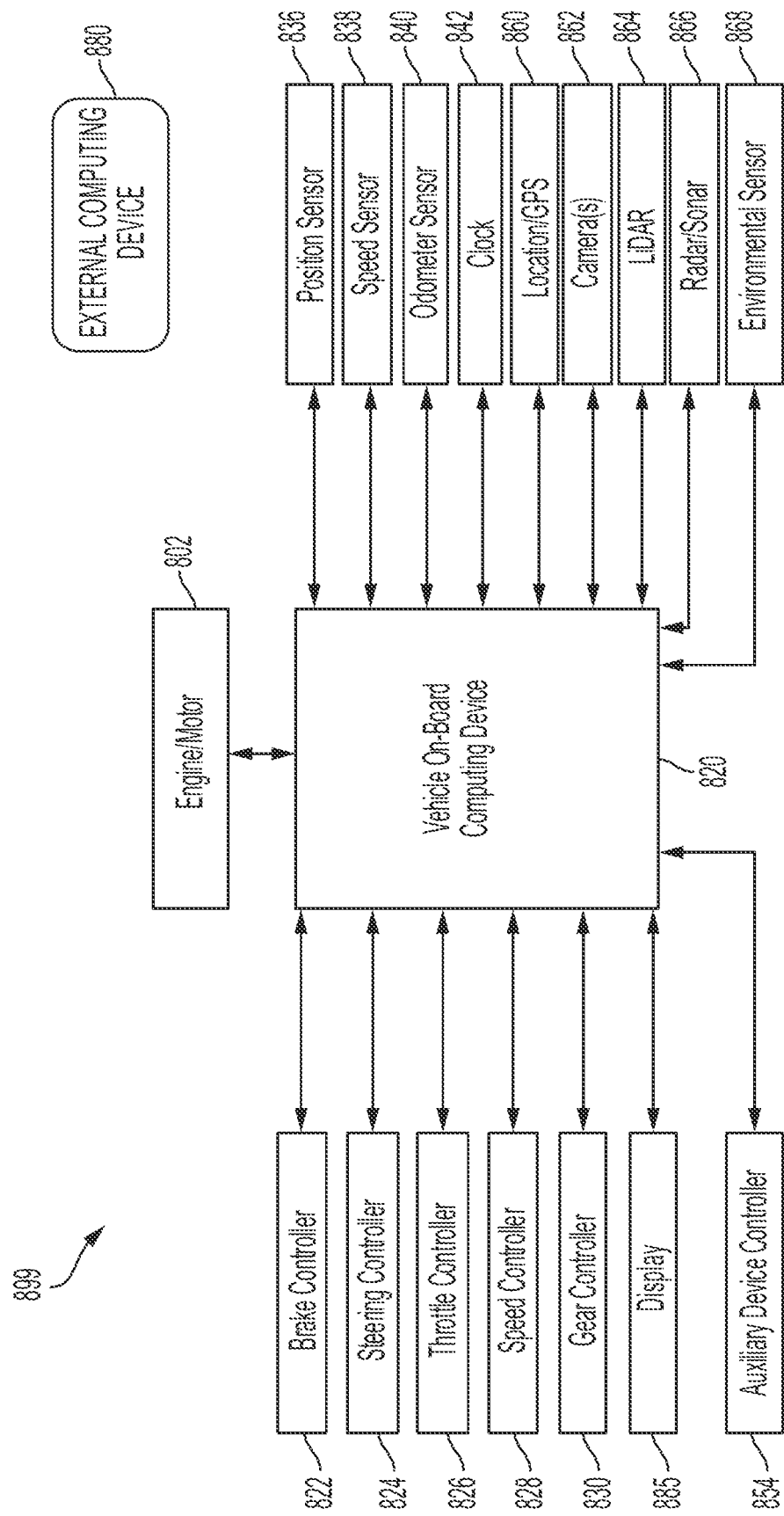
FIG. 8 illustrates examples of specific hardware that may make up the systems of FIG.

FIG. 8 illustrates an example system architecture 899 for a vehicle ("vehicle 899" hereinafter), such as an AV. The vehicle includes an engine or motor 802 and various sensors for measuring various parameters of the vehicle and/or its environment. Operational parameter sensors that are common to both types of vehicles include, for example: a position sensor 836 such as an accelerometer, gyroscope and/or inertial measurement unit; a speed sensor 838; and an odometer sensor 840. The vehicle also may have a clock 842 that the system uses to determine vehicle time during operation. The clock 842 may be encoded into the vehicle on-board computing device, it may be a separate device, or multiple clocks may be available.

The vehicle also will include various sensors that operate to gather information about the environment in which the vehicle is traveling. These sensors may include, for example: a location sensor 860 such as a global positioning system (GPS) device; object detection sensors such as one or more cameras 862; a LiDAR sensor system 864; and/or a radar and/or a sonar system 866. The sensors also may include environmental sensors 868 such as a precipitation sensor and/or ambient temperature sensor. The object detection sensors may enable the vehicle to detect moving actors and stationary objects that are within a given distance range of the vehicle 899 in any direction, while the environmental sensors collect data about environmental conditions within the vehicle's area of travel. The system will also include one or more cameras 862 for capturing images of the environment. Any or all of these sensors will capture sensor data that will enable one or more processors of the vehicle's on-board computing device 820 and/or external devices to execute programming instructions that enable the computing system to classify objects in the perception data, and all such sensors, processors and instructions may be considered to be the vehicle's perception system. The vehicle also may receive information from a communication device (such as a transceiver, a beacon and/or a smart phone) via one or more wireless communication link, such as those known as vehicle-to-vehicle, vehicle-to-object or other V2X communication links. The term "V2X" refers to a communication between a vehicle and any object that the vehicle may encounter or affect in its environment.

During a run of the vehicle, information is communicated from the sensors to an on-board computing device 820. The on-board computing device 820 analyzes the data captured by the perception system sensors and, acting as a motion planning system, executes instructions to determine a trajectory for the vehicle. The trajectory includes pose and time parameters, and the vehicle's on-board computing device will control operations of various vehicle components to move the vehicle along the trajectory. For example, the on-board computing device 820 may control braking via a brake controller 822; direction via a steering controller 824; speed and acceleration via a throttle controller 826 (in a gas-powered vehicle) or a motor speed controller 828 (such as a current level controller in an electric vehicle); a differential gear controller 830 (in vehicles with transmissions); and/or other controllers.

Geographic location information may be communicated from the location sensor 860 to the on-board computing device 820, which may then access a map of the environment that corresponds to the location information to determine known fixed features of the environment such as streets, buildings, stop signs and/or stop/go signals. Captured images from the cameras 862 and/or object detection information captured from sensors such as a LiDAR system 864 is communicated from those sensors) to the on-board computing device 520. The object detection information and/or captured images may be processed by the on-board computing device 820 to detect objects in proximity to the vehicle 899. In addition or alternatively, the AV may transmit any of the data to an external computing device 880 for processing. Any now known or yet to be known technique for performing object detection based on sensor data and/or captured images can be used in the embodiments disclosed in this document.

In addition, the AV may include an onboard display device 885 that may generate and output a user interface on which sensor data, vehicle status information, or outputs generated by the processes described in this document are displayed to an occupant of the vehicle. The display device may include, or a separate device may be, an audio speaker that presents such information in audio format. The AV may also include an auxiliary device controller 854.

Figure 9:
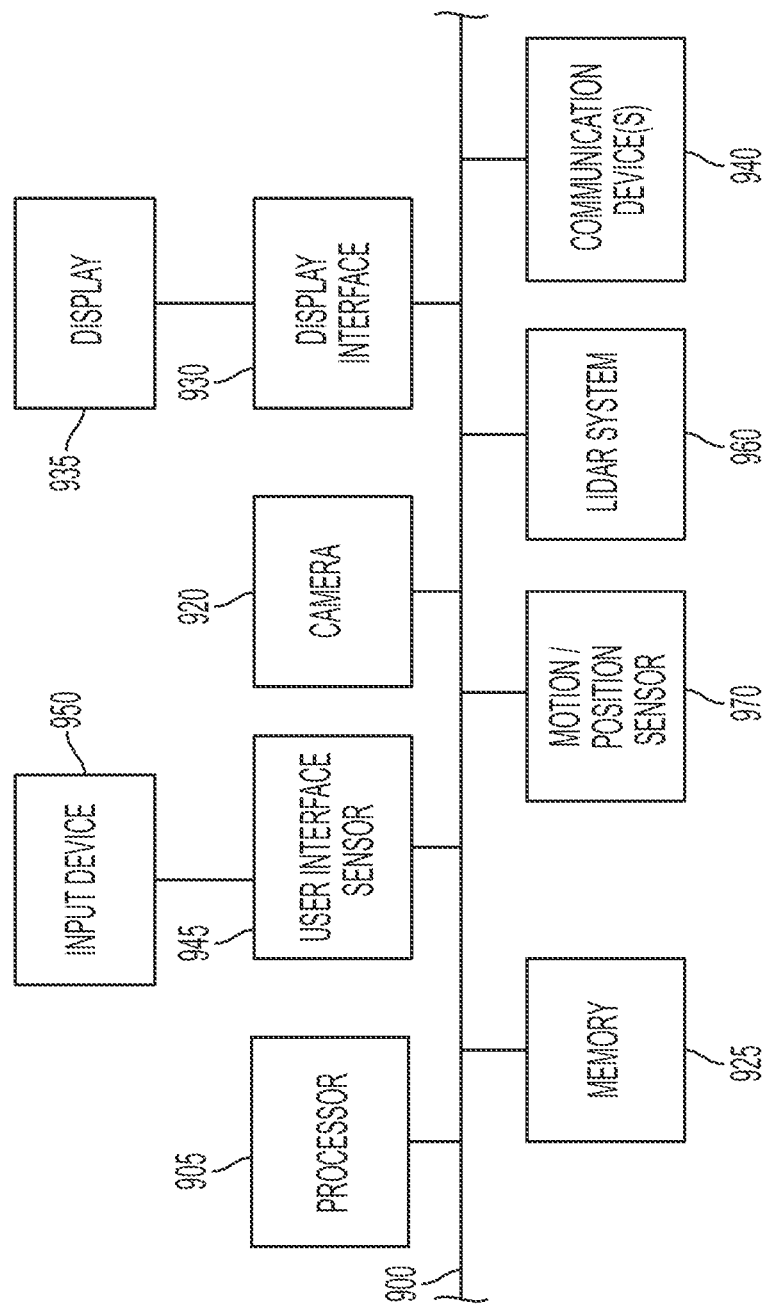
FIG. 9 is a block diagram that illustrates various elements of a possible electronic subsystem of an autonomous vehicle and/or external electronic device.

FIG. 9 depicts an example of internal hardware that may be included in any of the electronic components of the system, such as the onboard computing device of the AV, external monitoring and reporting systems, or remote servers. An electrical bus 900 serves as an information highway interconnecting the other illustrated components of the hardware. Processor 905 is a central processing device of the system, configured to perform calculations and logic operations required to execute programming instructions. As used in this document and in the claims, the terms "processor" and "processing device" may refer to a single processor or any number of processors in a set of processors that collectively perform a set of operations, such as a central processing unit (CPU), a graphics processing unit (GPU), a remote server, or a combination of these. Read only memory (ROM), random access memory (RAM), flash memory, hard drives and other devices capable of storing electronic data constitute examples of memory devices 925. A memory device may include a single device or a collection of devices across which data and/or instructions are stored. Various embodiments of the invention may include a computer-readable medium containing programming instructions that are configured to cause one or more processors, print devices and/or scanning devices to perform the functions described in the context of the previous figures.

An optional display interface 930 may permit information from the bus 900 to be displayed on a display device 935 in visual, graphic or alphanumeric format, such as an in-dashboard display system of the vehicle. An audio interface and audio output (such as a speaker) also may be provided. Communication with external devices may occur using various communication devices 940 such as a wireless antenna, a radio frequency identification (RFID) tag and/or short-range or near-field communication transceiver, each of which may optionally communicatively connect with other components of the device via one or more communication system. The communication device(s) 940 may be configured to be communicatively connected to a communications network, such as the Internet, a local area network or a cellular telephone data network.

The hardware may also include a user interface sensor 945 that allows for receipt of data from input devices 950 such as a keyboard or keypad, a joystick, a touchscreen, a touch pad, a remote control, a pointing device and/or microphone. Digital image frames also may be received from a camera 920 that can capture video and/or still images. The system also may receive data from a motion and/or position sensor 970 such as an accelerometer, gyroscope or inertial measurement unit. The system also may include and receive data via a LiDAR system 960, when used in the context of autonomous vehicles.

The features and functions disclosed above, as well as alternatives, may be combined into many other different systems or applications. Various components may be implemented in hardware or software or embedded software. Various presently unforeseen or unanticipated alternatives, modifications, variations or improvements may be made by those skilled in the art, each of which is also intended to be encompassed by the disclosed embodiments.

Terminology that is relevant to the disclosure provided above includes:

The term "vehicle" refers to any moving form of conveyance that is capable of carrying either one or more human occupants and/or cargo and is powered by any form of energy. The term "vehicle" includes, but is not limited to, cars, trucks, vans, trains, autonomous vehicles, aircraft, aerial drones and the like. An "autonomous vehicle" is a vehicle having a processor, programming instructions and drivetrain components that are controllable by the processor without requiring a human operator. An autonomous vehicle may be fully autonomous in that it does not require a human operator for most or all driving conditions and functions. Alternatively, it may be semi-autonomous in that a human operator may be required in certain conditions or for certain operations, or that a human operator may override the vehicle's autonomous system and may take control of the vehicle. Autonomous vehicles also include vehicles in which autonomous systems augment human operation of the vehicle, such as vehicles with driver-assisted steering, speed control, braking, parking and other advanced driver assistance systems.

A "run" of a vehicle refers to an act of operating a vehicle and causing the vehicle to move about the real world. A run may occur in public, uncontrolled environments such as city or suburban streets, highways, or open roads. A run may also occur in a controlled environment such as a test track.

When used in the context of autonomous vehicle motion planning, the term "trajectory" refers to the plan that the vehicle's motion planning system will generate, and which the vehicle's motion control system will follow when controlling the vehicle's motion. A trajectory includes the vehicle's planned position and orientation at multiple points in time over a time horizon, as well as the vehicle's planned steering wheel angle and angle rate over the same time horizon. An autonomous vehicle's motion control system will consume the trajectory and send commands to the vehicle's steering controller, brake controller, throttle controller and/or other motion control subsystem to move the vehicle along a planned path.

A "trajectory" of an actor that a vehicle's perception or prediction systems may generate refers to the predicted path that the actor will follow over a time horizon, along with the predicted speed of the actor and/or position of the actor along the path at various points along the time horizon.

An "electronic device" or a "computing device" refers to a device that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions.

The terms "memory," "memory device," "data store," "data storage facility" and the like each refer to a non-transitory device on which computer-readable data, programming instructions or both are stored. Except where specifically stated otherwise, the terms "memory," "memory device," "data store," "data storage facility" and the like are intended to include single device embodiments, embodiments in which multiple memory devices together or collectively store a set of data or instructions, as well as individual sectors within such devices.

The terms "processor" and "processing device" refer to a hardware component of an electronic device that is configured to execute programming instructions, such as a microprocessor or other logical circuit. A processor and memory may be elements of a microcontroller, custom configurable integrated circuit, programmable system-on-a-chip, or other electronic device that can be programmed to perform various functions. Except where specifically stated otherwise, the singular term "processor" or "processing device" is intended to include both single-processing device embodiments and embodiments in which multiple processing devices together or collectively perform a process.

The term "classifier" means an automated process by which an artificial intelligence system may assign a label or category to one or more data points. A classifier includes an algorithm that is trained via an automated process such as machine learning. A classifier typically starts with a set of labeled or unlabeled training data and applies one or more algorithms to detect one or more features and/or patterns within data that correspond to various labels or classes. The algorithms may include, without limitation, those as simple as decision trees, as complex as Naïve Bayes classification, and/or intermediate algorithms such as k-nearest neighbor. Classifiers may include artificial neural networks (ANNs), support vector machine classifiers, and/or any of a host of different types of classifiers. Once trained, the classifier may then classify new data points using the knowledge base that it learned during training. The process of training a classifier can evolve over time, as classifiers may be periodically trained on updated data, and they may learn from being provided information about data that they may have misclassified. A classifier will be implemented by a processor executing programming instructions, and it may operate on large data sets such as image data, LIDAR system data, and/or other data.

A "machine learning model" or a "model" refers to a set of algorithmic routines and parameters that can predict an output(s) of a real-world process (e.g., prediction of an object trajectory, a diagnosis or treatment of a patient, a suitable recommendation based on a user search query, etc.) based on a set of input features, without being explicitly programmed. A structure of the software routines (e.g., number of subroutines and relation between them) and/or the values of the parameters can be determined in a training process, which can use actual results of the real-world process that is being modeled. Such systems or models are understood to be necessarily rooted in computer technology, and in fact, cannot be implemented or even exist in the absence of computing technology. While machine learning systems utilize various types of statistical analyses, machine learning systems are distinguished from statistical analyses by virtue of the ability to learn without explicit programming and being rooted in computer technology.

In this document, when relative terms of order such as "first" and "second" are used to modify a noun, such use is simply intended to distinguish one item from another, and is not intended to require a sequential order unless specifically stated.

The invention claimed is:

1. A method of determining relevance of objects detected by a vehicle in an environment, the method comprising:
  receiving a data log of a run of a vehicle in an environment, wherein the data log includes perception data captured by sensors of the vehicle during the run;
  identifying an interaction time, wherein the interaction time is a time window from a selected point in time during which the vehicle can react with an object;
  identifying, based on a lane in which the vehicle traveled during the run, a look-ahead lane;
  defining a region of interest (ROI) that includes a lane segment within the look-ahead lane;
  identifying, from the perception data, a plurality of objects that the vehicle detected within the ROI during the run;
  for each of the objects detected within the ROI during the run, determining a detectability value by measuring an amount of the object that the vehicle detected within the interaction time, wherein determining the detectability value for each object comprises:
  measuring an amount of the interaction time during which the object is within the ROI, and
  calculating, using the amount of the interaction time during which the object is within the ROI, the detectability value as a percentage of the interaction time that the object is within the ROI;
identifying a subset that includes only those objects having a detectability value that exceeds a threshold;
classifying any object that is in the subset as a priority relevant object; and
controlling the vehicle based on the priority relevant object.

2. The method of claim 1 further comprising using the subset to assess accuracy of a perception algorithm that the vehicle may use during a future run.

3. The method of claim 2, wherein using the subset to assess accuracy of the perception algorithm that the vehicle may use in a future run comprises applying the perception algorithm to data from the data log in a simulation to determine whether a value for a vehicle operational metric meets a minimum acceptable value.

4. The method of claim 1, wherein identifying the look-ahead lane comprises:
  identifying a speed of travel of the vehicle during the run while the vehicle was in a location in the lane;
  using the speed of travel to determine a potential distance of travel for the vehicle during the interaction time; and
  identifying the look-ahead lane as a lane that is within the potential distance of travel from the location.

5. The method of claim 1, wherein defining the ROI comprises: identifying a speed of travel of the vehicle during the run while the vehicle was in a location in the lane;
  using the speed of travel to determine a potential distance of travel for the vehicle during the interaction time; and
  defining the ROI to include at least the potential distance of travel ahead of the vehicle in both the lane of travel and in at least one adjacent lane that is next to the lane of travel.

6. The method of claim 1, wherein defining the ROI comprises:
  accessing a vector map that includes a location through which the vehicle traveled during the run;
  determining a potential distance of travel for the vehicle during the interaction time; examining the vector map and identifying any lane segments in the vector map that are within the potential distance of travel from the location; and including the identified lane segments in the ROI.

7. The method of claim 6, wherein defining the ROI further comprises: identifying, in the vector map, a feature that extends beyond the identified lane segments; and
  extending the ROI to include the identified feature.

8. The method of claim 1, wherein determining the detectability value for each object comprises:
  measuring a number of LiDAR points that are present in the perception data for the object; and
  using the number of LiDAR points to calculate the detectability value.

9. The method of claim 1, wherein determining the detectability value for each object comprises measuring an amount of occlusion between the object and the vehicle and using the measured amount to calculate the detectability value.

10. A system for determining relevance of objects detected by a vehicle in an environment, the system comprising:
  a processor; and
  a memory containing programming instructions that are configured to instruct the processor to:
  receive a data log of a run of a vehicle in an environment, wherein the data log includes perception data captured by sensors of the vehicle during the run,
  identify an interaction time, wherein the interaction time is a time window from a selected point in time during which the vehicle can react with an object,
  identify, based on a lane in which the vehicle traveled during the run, a look-ahead lane,
  define a region of interest (ROI) that includes a lane segment within the look-ahead lane,
  identify, from the perception data, a plurality of objects that the vehicle detected within the ROI during the run,
  for each of the objects, determine a detectability value by measuring an amount of the object that the vehicle detected within the interaction time, wherein the instructions to determine the detectability value for each object comprise instructions to:
    measure an amount of the interaction time during which the object is within the ROI, and
    calculate, using the amount of the interaction time during which the object is within the ROI, the detectability value as a percentage of the interaction time that the object is within the ROI,
  identify a subset that includes only those objects having a detectability value that exceeds a threshold,
  classify any object that is in the subset as a priority relevant object, and
  control the vehicle based on the priority relevant object.

11. The system of claim 10 further comprising additional programming instructions to use the subset to assess accuracy of a perception algorithm that the vehicle may use during a future run.

12. The system of claim 11, wherein the instructions to use the subset to assess accuracy of a perception algorithm that the vehicle may use in a future run comprise instructions to apply the perception algorithm to data from the data log in a simulation to determine whether a value for a vehicle operational metric meets a minimum acceptable value.

13. The system of claim 10, wherein the instructions to identify the look-ahead lane comprise instructions to:
  identify a speed of travel of the vehicle during the run while the vehicle was in a location in the lane;
  use the speed of travel to determine a potential distance of travel for the vehicle during the interaction time; and
  identify the look-ahead lane as a lane that is within the potential distance of travel from the location.

14. The system of claim 10, wherein instructions to define the ROI comprise instructions to:
  identify a speed of travel of the vehicle during the run while the vehicle was in a location in the lane;
  use the speed of travel to determine a potential distance of travel for the vehicle during the interaction time; and
  define the ROI to include at least the potential distance of travel ahead of the vehicle in both the lane of travel and in at least one adjacent lane that is next to the lane of travel.

15. The system of claim 10, wherein the instructions to define the ROI comprise instructions to:
  access a vector map that includes a location through which the vehicle traveled during the run;

determine a potential distance of travel for the vehicle during the interaction time;

examine the vector map and identifying any lane segments in the vector map that are within the potential distance of travel from the location; and include the identified lane segments in the ROI.

16. The system of claim 15, wherein the instructions to define the ROI further comprise instructions to:

identify, in the vector map, a feature that extends beyond the identified lane segments; and extend the ROI to include the identified feature.

17. The system of claim 10, wherein the instructions to determine the detectability value for each object comprise instructions to:

measure a number of LiDAR points that are present in the perception data for the object; and use the number of LiDAR points to calculate the detectability value.

18. The system of claim 10, wherein the instructions to determine the detectability value for each object comprise instructions to:

measure an amount of occlusion between the object and the vehicle; and use the measured amount to calculate the detectability value.

19. A computer program product comprising a memory and programming instructions that are configured to cause a processor to:

receive a data log of a run of a vehicle in an environment, wherein the data log includes perception data captured by sensors of the vehicle during the run, identify an interaction time, wherein the interaction time is a time window from a selected point in time during which the vehicle can react with an object, identify, based on a lane in which the vehicle traveled during the run, a look-ahead lane, define a region of interest (ROI) that includes a lane segment within the look-ahead lane, identify, from the perception data, a plurality of objects that the vehicle detected within the ROI during the run, for each of the objects, determine a detectability value by measuring an amount of the object that the vehicle detected within the interaction time, wherein the instructions to determine the detectability value for each object comprise instructions to:

measure an amount of the interaction time during which the object is within the ROI, and calculate, using the amount of the interaction time during which the object is within the ROI, the detectability value as a percentage of the interaction time that the object is within the ROI, identify a subset that includes only those objects having a detectability value that exceeds a threshold, classify any object that is in the subset as a priority relevant object, and control the vehicle based on the priority relevant object.

20. The computer program product of claim 19 further comprising additional programming instructions to use the subset to assess accuracy of a perception algorithm that the vehicle may use during a future run.

* * * * *